(12) United States Patent  
Palmhager et al.

(10) Patent No.: US 9,438,519 B2  
(45) Date of Patent: Sep. 6, 2016

(54) BYPASS-RTA

(71) Applicant: HMS INDUSTRIAL NETWORKS AB, Halmstad (SE)

(72) Inventors: Jörgen Palmhager, Halmstad (SE); Leif Malmberg, Halmstad (SE); Timmy Brolin, Halmstad (SE)

(73) Assignee: HMS INDUSTRIAL NETWORKS AB (SE)

( * ) Notice: Subject to any disclaimer, the term of this patent is extended or adjusted under 35 U.S.C. 154(b) by 0 days.

(21) Appl. No.: 14/647,817

(22) PCT Filed: Nov. 27, 2013

(86) PCT No.: PCT/SE2013/051398  
§ 371 (c)(1),  
(2) Date: May 27, 2015

(87) PCT Pub. No.: WO2014/084784  
PCT Pub. Date: Jun. 5, 2014

(65) Prior Publication Data  
US 2015/0295829 A1 Oct. 15, 2015

(30) Foreign Application Priority Data  
Nov. 27, 2012 (SE) ...................... 1251338

(51) Int. Cl.  
G06F 15/16 (2006.01)  
H04L 12/803 (2013.01)  
H04L 12/40 (2006.01)  
G06F 13/38 (2006.01)  
H04L 12/815 (2013.01)  
H04L 29/08 (2006.01)

(52) U.S. Cl.  
CPC ............ *H04L 47/122* (2013.01); *G06F 13/385* (2013.01); *H04L 12/40032* (2013.01); *H04L 47/22* (2013.01); *H04L 67/1095* (2013.01); *H04L 2012/4026* (2013.01)

(58) Field of Classification Search  
CPC ........... H04L 47/122; H04L 12/40032; H04L 47/22; H04L 67/1095; H04L 2012/4026  
See application file for complete search history.

(56) References Cited

U.S. PATENT DOCUMENTS

| 6,574,272 | B1 * | 6/2003 | Peace ...................... H04L 47/10 370/465 |
| 2006/0174343 | A1 * | 8/2006 | Duthie .................. G06F 21/554 726/23 |

(Continued)

FOREIGN PATENT DOCUMENTS

WO WO-2005124569 A1 12/2005

*Primary Examiner* — Moustafa M Meky  
(74) *Attorney, Agent, or Firm* — Condo Roccia Koptiw LLP

(57) ABSTRACT

An communication module for providing data communication between an industrial network and an electric device, said communication module is disclosed. The communication module comprises a network interface for connecting the communication module to the industrial network, the network interface being arranged to receive first data from the industrial network, a data processing unit connected to the network interface and arranged to receive second data, comprising at least a portion of said first data, from the network interface, the data processing unit being arranged to process said second data, a device interface for connecting the communication module to the electric device, the device interface being connected to the data processing unit and arranged to receive third data, comprising at least a portion of said second data, from the processing unit, wherein the communication module comprises communication circuitry interconnecting the network interface and the device interface, the communication circuitry being arranged to transmit fourth data comprising at least a portion of said first data different from said second data from the network interface to the device interface.

17 Claims, 3 Drawing Sheets

(56) References Cited

U.S. PATENT DOCUMENTS

| | | | |
|---|---|---|---|
| 2007/0039051 A1* | 2/2007 | Duthie | G06F 21/56 726/22 |
| 2008/0031279 A1 | 2/2008 | Hatakeyama et al. | |
| 2011/0166702 A1 | 7/2011 | Gazeau et al. | |
| 2012/0005500 A1* | 1/2012 | Tamura | G06F 1/3209 713/320 |

* cited by examiner

BYPASS-RTA

This application is the National Stage entry under 35 U.S.C. §371 of PCT Application Ser. No. PCT/SE2013/051398 filed Nov. 27, 2013, which claims the benefit of Swedish Patent Application No. 1251338-8 filed Nov. 27, 2012, the contents of which are hereby incorporated by reference in their entirety.

TECHNICAL FIELD

The present inventive concept generally relates to industrial network systems. In particular the present inventive concept relates to a communication module which is arranged to reduce the latency for at least some time critical data that is transmitted from the industrial network to an electric device via the communication module.

BACKGROUND OF THE INVENTION

Today most industrial plants include network communication between various entities in the plant for providing distributed control. The communication is normally carried out by means of a network such as a fieldbus network or an industrial Ethernet network. The fieldbus or industrial Ethernet network links controllable devices in the plant, such as motors, switches, valves etc, and data collecting devices, such as sensors, to programmable logic controllers (PLCs) which in turn are connected to a human machine interface (HMI) where an operator can monitor and control the plant. Examples of different fieldbus technologies are CANopen, DeviceNet, ControlNet, CC-Link, Modbus, INTERBUS, sercos and PROFIBUS. Likewise, many different industrial Ethernet technologies coexist, such as EtherCAT, POWERLINK, EtherNet/IP, Modbus TCP, PROFINET, sercos III and CC-Link IE Field.

Despite the above technologies share the generic names "fieldbus" or "industrial Ethernet" the differences between them may be substantial such that they are not readily interchangeable and may not be easily connected to each other. To this end, the applicant has developed a generic two-port communication module under the name Anybus™ which facilitates the connection of an electric device to various different network types by providing an Anybus™ interface on one of the ports and any fieldbus or industrial Ethernet interface on the other port. The communication module comprises electronic circuitry which translates data communicated between the device and different industrial network protocols such that the device may communicate with other network devices independently of the network used.

The speed on an industrial network may vary considerably. Some network standards, such as LIN (Local Interconnect Network) provides low speed and low cost busses for automotive applications in order to interconnect smart sensors and actuators. The speed (e.g. <20 kbit/s for LIN) on such networks is not a critical aspect and may hence be low. If higher network speeds are required i.a. Profibus may be used which provides speeds up to 12 Mbit/s, and in extremely time-critical real time control applications, a much higher network bandwidth is provided i.a. by EtherCAT and Ethernet/IP which today provide speeds up to 100 Mbit/s. Systems like CC-Link IE Field even uses 1 Gbit/s to obtain required performance and real-time levels.

When a communication module is connected to a high speed fieldbus or industrial Ethernet network, and used together with a device in real time applications, it is of outmost importance that the time delay (latency) in the communication unit is kept at a minimum. That is, the time from reception of data (e.g. a data frame) in the communication unit until the relevant data in the frame is forwarded to the device to which the communication unit is connected must be very short. In some applications the delay, in respect of the transmission of process data, in the communication unit may not exceed 15 µs in order to ensure correct functioning of the device.

FIG. 1 discloses by way of example the architecture of a prior art communication module 100 for use in an industrial network. The Industrial network 110 is connected to a network interface 120 in the communication unit 100. The network interface 120 includes at least portions of what is referred to as layer 1 (physical layer) of the protocol stack according to the seven-layer OSI reference model (sometimes abbreviated to three layers for fieldbuses), and receives signals representing the data frames sent over the industrial network 110. The design of the network interface (connectors, interface electronics etc.) depends on which industrial network the communication module 100 is arranged to be connected to, i.e. various transmission technologies are available, such as wired (e.g. RS485), optical (e.g. fiber cables) and wireless. Upon reception of the signals representing a data frame, the network interface 120 performs layer 1 processing of the signals and sends the data frame (or part of the frame depending on the application) to a data processing unit 130 arranged in the communication unit 100. The data processing unit 130 performs any necessary higher layer processing (normally layer 2) and sends the data, which could relate to process data, parameter data, diagnostic data or the like, to the device 140 (e.g. a motor control). Normally a buffer 150 is used for buffering data to be transmitted/received to/from the device 140, and a device interface 160 is arranged in the communication unit 100 for providing the physical signals to the device 140.

Reference to the above, in order to keep the delay in the communication unit 100, and in any communication equipment in general, at a minimum specialized network processors are normally used for implementing the network interface 120 and the data processing unit 130.

SUMMARY OF THE INVENTION

In view of the above, an objective of the invention is to provide a method and a communication unit by which the latency in sending data and signals between an industrial network and an electric device is kept at a minimum.

In particular, an objective is to provide a method and a communication unit in which time critical real time data are not sent to a data processing unit in the communication unit but rather bypassed in order to reduce the latency in the communication unit for such data.

According to a first aspect, the present invention is realized by a communication module for providing data communication between an industrial network and an electric device, said communication module comprising: a network interface for connecting the communication module to the industrial network, the network interface being arranged to receive first data from the industrial network, a data processing unit connected to the network interface and arranged to receive second data, comprising at least a portion of said first data, from the network interface, the data processing unit being arranged to process said second data, a device interface for connecting the communication module to the electric device, the device interface being connected to the data processing unit and arranged to receive third data, comprising at least a portion of said second data, from the processing unit, wherein the communication module comprises communication circuitry interconnecting the network interface and the device interface, the communication circuitry being arranged to transmit fourth data comprising at least a portion of said first data different from said second data from the network interface to the device interface.

An advantage is that data which need to be delivered to the electric device rapidly will not be substantially delayed by the data processing unit since the communication circuitry in the communication module will be able to bypass the processing unit for such data upon reception of the data in the network interface.

The device interface may be arranged to receive data from the electric device and send at least a portion of the received data to the processing unit, the data processing unit may be arranged to process said data received from the device interface and send at least a portion of said processed data to the network interface, the network interface may be arranged to send at least a portion of said processed data onto the industrial network, the communication circuitry may be arranged to send at least a portion of the data received in the device interface to the network interface, wherein said data sent by the communication circuitry is different from said data transferred to the processing unit.

An advantage with this embodiment is that there may be a bidirectional flow of data in the communication unit.

The network interface may arranged to determine if the data received from the industrial network relates to real time data and send such real time data to the device interface via the communication circuitry.

An advantage with this embodiment is that real time data may be transferred between the industrial network and the electric device with a very low latency thereby i.a. enabling higher transmission rates in the industrial network. Other types of data, such as parameter data, diagnostic data or the like may be sent to the processing unit for any necessary protocol conversion.

The communication circuitry may be part of network interface.

An advantage with this embodiment is that a the network interface and the communication circuitry may be implemented in a very compact design.

The network interface, the communication circuitry, the triple buffer and the device interface may be implemented in an Field Programmable Gate Array (FPGA).

An advantage with this embodiment is that a very compact design of the communication unit may be provided.

The communication unit may comprise a triple buffer connected between the device interface and the communication circuitry.

An advantage with this embodiment is that data may be buffered with low latency such that the device interface and the communication circuitry may i.a. run at different rates.

The communication unit may comprise communication circuitry connected between the network interface and the device interface for providing a synchronization signal from the network interface to the device interface.

An advantage with this embodiment is that a synchronization signal received from the industrial network may be sent to the electric device very fast.

The network interface may be arranged to receive the first data in one or more data frames, such as Ethernet data frames, CAN data frames or ControlNet data frames.

An advantage with this embodiment is that the network interface may easily interpret data present in the frames, such as frame headers, in order to determine if the data received from the industrial network relates to real time data which need to bypass the processing unit.

According to a second aspect of the inventive concept, having the same advantages as the first aspect disclosed above, the present inventive concept is realized by a method implemented in a communication module for providing data communication between an industrial network and an electric is device, said method comprising: receiving data from the industrial network; determining if the received data is of at least a first type or a second type; if the received data belongs to the first type, sending at least a portion of the received data to a processing unit for performing data processing on the at least a portion of the received data, and sending the processed data to the electric device; and if the received data belongs to the second type, bypassing the processing unit and sending at least a portion of the received data to the electrical device.

The method may comprise receiving data from the electric device; determining if the received data is of at least a first type or a second type; if the received data belongs to the first type, sending at least a portion of the received data to a processing unit for performing data processing on the at least a portion of the received data, and sending the processed data to the industrial network; and if the received data belongs to the second type, bypassing the processing unit and sending at least a portion of the received data to the industrial network.

The second type of data may relate to real time data.

The method may comprise sending the at least a portion of the received data or the processed data to a triple buffer.

The method may comprise receiving a synchronization signal from the industrial network, and bypassing the processing unit and sending synchronization signal to the electrical device.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 2:
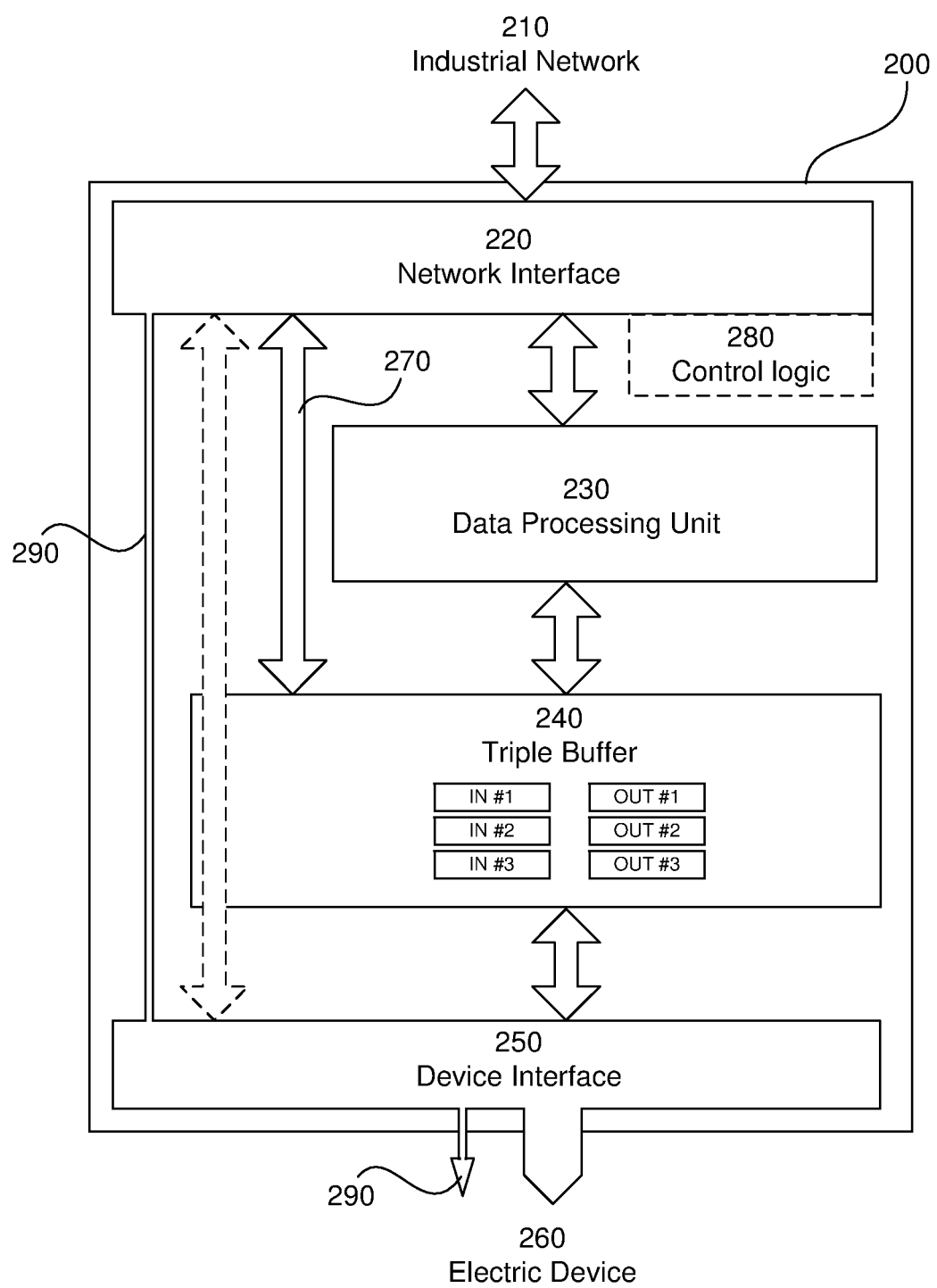
FIG. 2 is a schematic block diagram of a communication unit according to a first aspect of the present inventive concept.

FIG. 2 discloses by way of example the architecture of a communication module 200 for use in an industrial network according to one aspect of the present inventive concept.

The Industrial network 210 is connected to a network interface 220 in the communication unit 200. The network interface 220 includes at least portions of what is referred to as layer 1 (physical layer) of the protocol stack according to the seven-layer OSI reference model (sometimes abbreviated to three layers for fieldbuses), and receives signals representing the data (e.g. data frames depending on which industrial network the network interface 220 is connected to) sent over the industrial network 210. In the following, the data received from the industrial network 210 will be referred to as "first data". The design of the network interface 220 (connectors, interface electronics etc.) depends on which industrial network 210 the communication module 200 is arranged to be connected to, i.e. various transmission technologies are available, such as wired (e.g. RS485), optical (e.g. fiber cables) and wireless. Depending on which industrial network 210 the communication module 200 is connected to the network interface 220 is arranged to receive the first data in one or more data frames, such as Ethernet data frames, CAN data frames or ControlNet data frames.

The network interface 220 may be implemented by means of an field programmable gate array (FPGA) in order to enable layer 1 processing of the data signals received from the network. The network interface 220 also performs layer 1 processing of signals that are to be transmitted onto the industrial network 210. In other words, the communication unit 200 comprises a network interface 220 for connecting the communication module 200 to the industrial network 210, the network interface 220 being arranged to receive first data from the industrial network 210.

Figure 3:
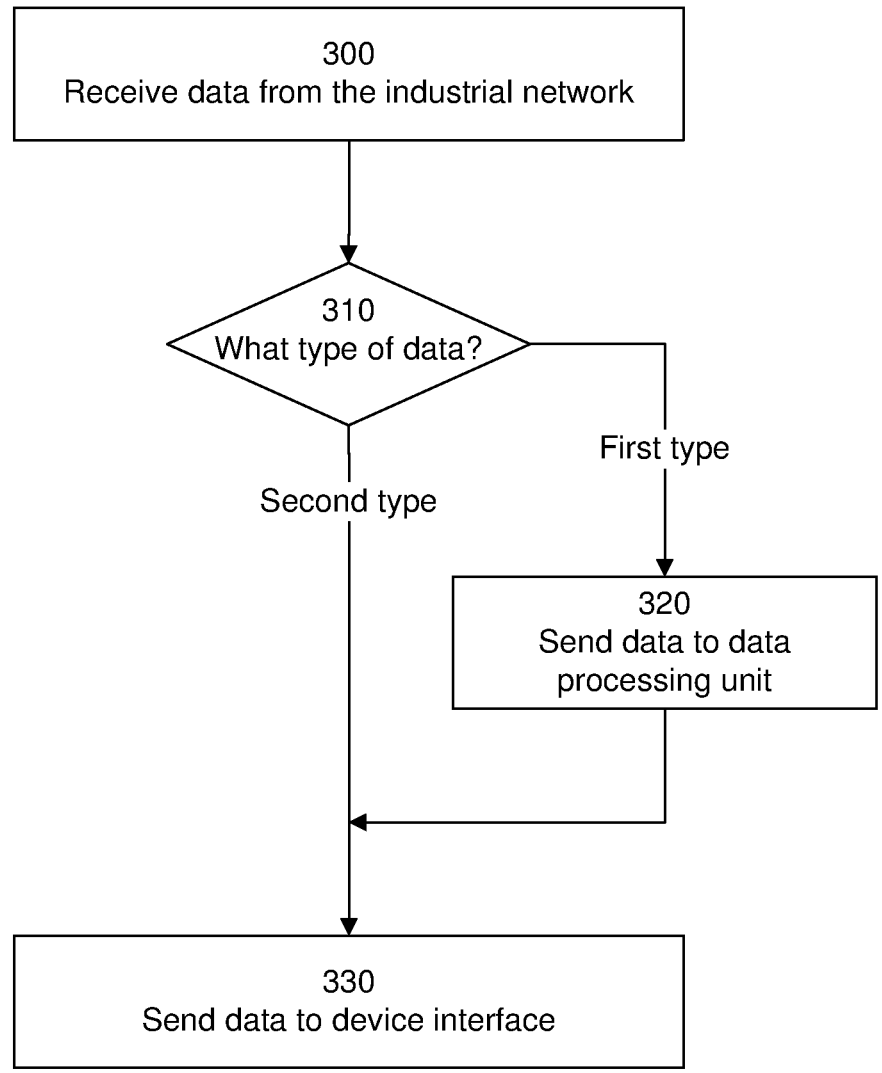
FIG. 3 is a flow chart illustrating a method according to a second aspect of the present inventive concept.

As will be disclosed in more detail in relation to FIG. 3, upon reception of the signals representing data (e.g. a data frame) sent over the industrial network 210, the network interface 220 determines if the payload data received from the network 210 shall be sent to a data processing unit 230 or if the data relates to real time data (such as time critical process data) and shall bypass the data processing unit 230 and be sent via communication circuitry indicated by arrow 270 in FIG. 2 to a triple buffer 240 or a device interface 250 arranged in the communication unit 200. The setup of which data that is to bypass the data processing unit 230 may be done when the electric device 260 starts up and initially communicates with communication unit 200. The setup may also be done dynamically when the electric device 260 is running. The electric device 260 may inform the communication unit 200 that e.g. "start/stop" commands, "speed" commands and "running speed" process data are to be handled as real time data. This information may be stored in the communication unit 200 and also provided to a PLC connected to the industrial network 210 and used for controlling the electric device 260. The communication unit 200 may hence determine if data received from the industrial network 210 or from the electric device 260 relates to real time data. In other words, the network interface 220 is arranged to determine if the data received from the industrial network 210 relates to real time data and send such real time data to the device interface 250 via the communication circuitry 270. The device interface 250 is preferably implemented in the same FPGA as the network interface 220.

Data sent to the data processing unit 230 will in the following be referred to as "second data" while data bypassing the data processing unit 230 will be referred to as "fourth data". Alternatively, should the communication unit 200 be implemented without a triple buffer 240, the network interface 220 will send the data to the device interface 250 rather than to the triple buffer 240 as indicated by the dashed arrow in FIG. 2. Both the network interface 220 and the communication circuitry 270 are preferably implemented in the same FPGA, wherein the communication circuitry 270 may be considered as being part of network interface 220.

Figure 1:
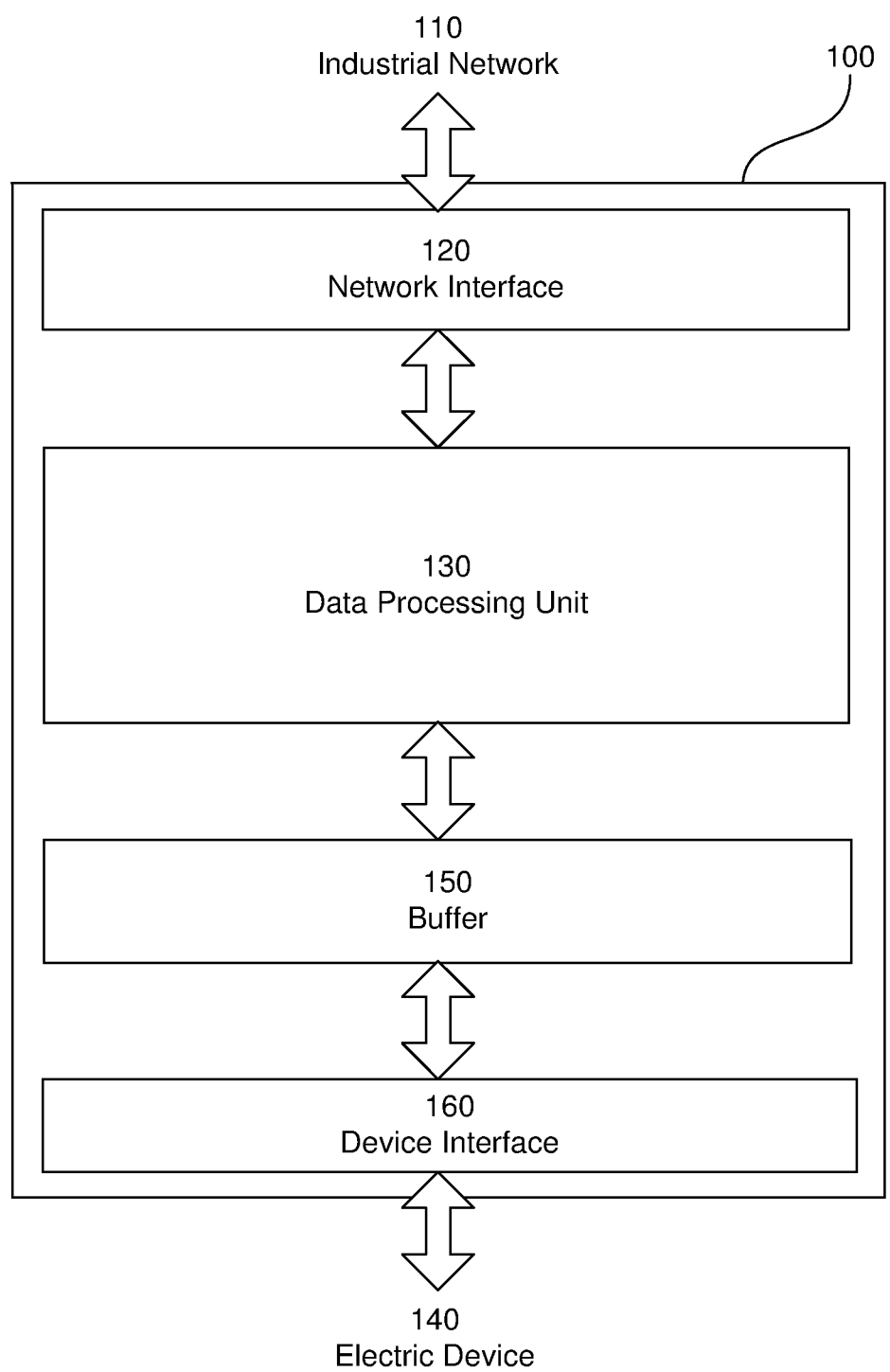
FIG. 1 is a schematic block diagram of a communication unit according to the prior art.

The triple buffer 240 illustrated in FIG. 1 provides a way of passing data between the data processing unit 230 and the device interface 250 (or between the network interface 220 and the device interface 250 should the data processing unit 230 be bypassed) even if the data processing unit 230 (or network interface 220) and the device interface 250 are running at different rates. Compared to a single buffer or a double buffer, the triple buffer 240 provides a speed improvement in respect of data transfer. That is, if a single buffer is used, the sending unit (e.g. the network interface 220) cannot write to the buffer while the receiving unit (e.g. the device interface 250) is reading the buffer and must hence wait for the buffer to be available for writing. This waiting period could be several milliseconds during which the buffer cannot be touched by the sending unit. If a double buffer is used, the sending unit can write to one buffer while the receiving unit reads from the other buffer, but the buffers are still locked when swapping the contents of the buffers (or when swapping the pointers to the buffers). To work around this, the communication module 200 preferably comprises a triple buffer 240. The triple buffer 240 comprises one buffer for reading, one for writing, and one as temporary storage of the most recently completed write(s). By this arrangement the sending unit and receiving unit need not to wait on the other. The writing buffer can be accessed without locking, as can the reading buffer. Triple buffering implies three buffers, but the buffering in the communication module 200 can be extended to as many buffers as is practical for the application. The triple buffer 240 is preferably implemented in the same FPGA as the network interface 220.

If the network interface 220 decides to send the data to the data processing unit 230, the data processing unit 230 will perform any necessary higher layer processing (normally layer 2) and thereafter send the processed data, which could relate to parameter data, diagnostic data or the like, to the triple buffer 240 or to the device interface 250 should the communication unit be implemented without a triple buffer 240. The data processing unit 230 also performs any necessary protocol conversion of e.g. acyclic parameter data or diagnosis data. Processed data sent from the data processing unit 230 to the triple buffer 240 or to the device interface 250 will in the following be referred to as "third data". The device interface 250 then sends the data to an electric device 260 (e.g. a motor control). In other words, the data processing unit 230 is connected to the network interface 220 and arranged to receive second data, comprising at least a portion of the first data, from the network interface 220, the data processing unit 230 being arranged to process said second data; the communication module 200 also comprises a device interface 250 for connecting the communication module 200 to the electric device 260, the device interface 250 being connected to the data processing unit 230 and arranged to receive third data, comprising at least a portion of the second data, from the processing unit 230.

Similarly, data that is received in the device interface 250 from the electric device 260 is sent to the triple buffer 240 and then forwarded to the data processing unit 230, or alternatively, if the data relates to real time data, sent to the network interface 220 thereby bypassing the data processing unit 230.

FIG. 3 illustrates a flow chart for a method implementing efficient data communication between an industrial network and an electric device connected to the industrial network via a communication module.

With reference to both FIG. 2 and FIG. 3. the method starts in block 300 where the network interface 220 receives first data from the industrial network 210. The first data is normally in the form of signals representing data frames such as Ethernet data frames, CAN data frames or Control-Net data frames. However, the exact representation of the data depends on which industrial network 210 the network interface 220 is connected to.

In block 310 the network interface 220 or other additional control logic 280 (illustrated by the dashed block in FIG. 2) connected to the network interface 220 decides on the type of data received from the industrial network 210. The decision on the type of data received may be based on different criteria depending on the type of industrial network 210 used for communication. By way of example, a master station on the industrial network 210 may use a broadcast polling method to communicate with each device on the network, i.e. the master sends a broadcast message frame to the entire network, whereupon all devices on the network receives the message but only the first device responds with its data (which data may be real time data). When the master has received the reply from the first device it sends a message to the second station which responds with its data (which data may be real time data). This procedure continues until all devices have been polled. As part of, or in addition to, the messaging above, the master may send cyclic data (which data may be real time data) or different types of messages to the devices on the network. The cyclic data and the messages are normally arranged in a frame format comprising the address of the sending unit, the address of the recipient, the amount of data to be sent, type of data in the frame, etc. Thus, the decision on which type of data that is received may e.g. be based on the timing of the reception of the data (with reference to an initial message) or on information found in the data frames (e.g. in the header of the frame) received in the device. In this context it is understood that since the present inventive concept relates to a communication module 200 that is to be connected between the industrial network 210 and the electric device 260, the network interface 220 may use this information in order to determine which type of data that is received.

If it is decided that the received data belongs to a first type of data which do not relate to time critical data such as parameter data, diagnostic data or the like, the method continues to block 320, wherein the network interface 220 sends the data to the data processing unit 230 for performing any necessary processing, such as protocol conversion, on the data.

After processing the data the method continues to block 330 where the data processing unit 230 sends the processed data to the device interface 250 for further transmission to the electric device 260. As mentioned above, the data may be sent to a triple buffer 240 rather than directly to the device interface 250 in order to enable the data processing unit 230 and the device interface 250 to i.a. run at different rates.

If it is decided that the received data belongs to a second type of data which do relate to time critical data, such as real time process data, the method continues from block 310 directly to block 330, where the network interface 220 bypass the data processing unit 230 and sends the data directly to the network interface 250. The bypass is enabled by communication circuitry 270 arranged in the communication module 200. As mentioned above, the data may be sent from the network interface 210 to a triple buffer 240 rather than directly to the device interface 250 in order to enable the network interface 210 and the device interface 250 to i.a. run at different rates.

Irrespective of whether the data received in the device interface 250 comes from the data processing unit 230 or the network interface 210, the device interface preferably generates an interrupt signal to the electric device 260 indicating that new data is available in the communication module 200.

Reference again to FIG. 2, the communication unit 200 may be equipped with electronic circuitry, indicated by the line 290 in FIG. 2, by which the network interface 220 may provide a synchronization signal directly to the device interface 250. The synchronization may be needed e.g. when electrical devices are spatially distributed but require simultaneous actions on received data. The synchronization signal may e.g. be based on synchronization signals periodically sent on the network (as with CANopen) which may give a synchronous behavior on an actually asynchronous network. That is, the devices on the network do not handle any received process data until a synchronization message is received. Alternatively distributed clock as described in IEEE 1588 standard may be used, by which the devices synchronize by sampling time stamps on incoming and outgoing frames. Irrespective of the method used by the industrial network to provide the synchronization signals 290, the network interface 220, after receiving the synchronization signal from the industrial network 210, bypass the data processing unit 230 and provides the synchronization signal 290 directly to the device interface 250. By this arrangement the latency in the communication module 200 will be kept at a minimum wherein the jitter on the timing in the network will be minimized. The applicant has measured latencies down to <1 us with this arrangement.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A communication module for providing data communication between an industrial network and an electric device, said communication module comprising:
    a network interface for connecting the communication module to the industrial network, the network interface being arranged to receive first data from the industrial network,
    a data processing unit connected to the network interface and arranged to receive second data, comprising at least a portion of said first data, from the network interface, the data processing unit being arranged to process said second data,
    a device interface for connecting the communication module to the electric device, the device interface being connected to the data processing unit and arranged to receive third data, comprising at least a portion of said second data, from the processing unit,
    wherein the communication module comprises communication circuitry interconnecting the network interface and the device interface, the communication circuitry being arranged to transmit fourth data comprising at least a portion of said first data different from said second data from the network interface to the device interface.

2. The communication module according to claim 1, wherein the device interface is arranged to receive data from the electric device and send at least a portion of the received data to the processing unit, the data processing unit is arranged to process said data received from the device interface and send at least a portion of said processed data to the network interface, the network interface is arranged to send at least a portion of said processed data onto the industrial network, the communication circuitry is arranged to send at least a portion of the data received in the device interface to the network interface, said data sent by the communication circuitry being different from said data transferred to the processing unit.

3. The communication module according to claim 1, wherein the network interface is arranged to determine if the data received from the industrial network relates to real time data and send such real time data to the device interface via the communication circuitry.

4. The communication module according to claim 1, wherein the communication circuitry is part of network interface.

5. The communication module according to claim 1, wherein the network interface, the communication circuitry, the device interface, and a triple buffer operably connected between the device interface and the communication circuitry are implemented in an FPGA.

6. The communication module according to claim 1, further comprising a triple buffer connected between the device interface and the communication circuitry.

7. The communication module according to claim 1, further comprising communication circuitry connected between the network interface and the device interface for providing a synchronization signal from the network interface to the device interface.

8. The communication module according to claim 1, wherein the network interface is arranged to receive the first data in one or more data frames, such as Ethernet data frames, CAN data frames or ControlNet data frames.

9. A communication module comprising:
   a first field programmable gate array (FPGA) unit configured to connect the communication module to an industrial network, wherein the first FPGA unit is configured to receive first data from the industrial network;
   a processor operably connected to the first FPGA unit, wherein the processor is configured to:
      receive second data from the first portion of the FPGA, the second data comprising at least a portion of the first data, and
      process said second data;
   a second FPGA unit configured to connect to the communication module to an electric device, the second FPGA unit being operably connected to the processor and configured to receive third data from the processing unit, the third data comprising at least a portion of said second data; and
   a third FPGA unit configured to interconnect the first FPGA unit and the second FPGA unit, the third FPGA unit being configured to transmit fourth data comprising at least a portion of said first data that is different from said second data from the first FPGA unit to the second FPGA unit.

10. The communication module according to claim 9, wherein the second FPGA unit is arranged to receive data from the electric device and send at least a portion of the received data to the processor, the processor is arranged to process said data received from the second FPGA unit and send at least a portion of said processed data to the first FPGA unit, the first FPGA unit is arranged to send at least a portion of said processed data onto the industrial network, the third FPGA unit is arranged to send at least a portion of the data received in the second FPGA unit to the first FPGA unit, said data sent by the third FPGA unit being different from said data transferred to the processing unit.

11. The communication module according to claim 9, wherein the first FPGA unit is arranged to determine if the data received from the industrial network relates to real time data and send such real time data to the second FPGA unit via the third FPGA unit.

12. The communication module according to claim 9, wherein the third FPGA unit is part of the first FPGA unit.

13. The communication module according to claim 9, wherein the first FPGA unit, the second FPGA unit, and the third FPGA unit are each implemented in the same FPGA.

14. The communication module according to claim 9, further comprising a fourth FPGA unit configured as a triple buffer to connect between the second and third FPGA units.

15. The communication module according to claim 9, further comprising the third FPGA unit is configured to provide a synchronization signal from the first FPGA unit to the second FPGA unit.

16. The communication module according to claim 9, wherein first FPGA unit is arranged to receive the first data in one or more data frames.

17. The communication module according to claim 16, wherein the one or more data frames comprise one or more of Ethernet data frames, CAN data frames, or ControlNet data frames.

* * * * *